(12) United States Patent
Salhi et al.

(10) Patent No.: US 9,042,052 B1
(45) Date of Patent: May 26, 2015

(54) MAGNETIC WRITER HAVING A PARTIALLY SHUNTED COIL

(71) Applicant: Western Digital (Fremont), LLC, Fremont, CA (US)

(72) Inventors: El-Amine Salhi, Fremont, CA (US); Tao Pan, San Jose, CA (US); Zhigang Bai, Fremont, CA (US); Donghong Li, Pleasanton, CA (US); Yan Chen, Fremont, CA (US); Neil D. Knutson, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/312,635

(22) Filed: Jun. 23, 2014

(51) Int. Cl.
*G11B 5/17* (2006.01)
(52) U.S. Cl.
CPC .......................................... *G11B 5/17* (2013.01)
(58) Field of Classification Search
CPC .................................. G11B 5/17; G11B 5/127
USPC ............. 360/123.06, 123.19, 123.02, 123.03, 360/123.05, 123.09, 125.3, 125.12, 125.06, 360/125.03, 125.27, 125.13
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |

(Continued)

*Primary Examiner* — Allen T Cao

(57) ABSTRACT

A method and system provide a magnetic transducer having an air-bearing surface (ABS). The magnetic transducer includes a main pole and at least one coil for energizing the main pole. The coil(s) have a number of turns. The magnetic transducer also includes at least one shunt coupled to at least one of the number of turns. At least one remaining turn of the number of turns carries a current. The shunt(s) carry a portion of the current from the shunted turn of the number of turns. Thus, the coil(s) have an effective number of turns is less than the number of turns.

24 Claims, 6 Drawing Sheets

(56) References Cited

U.S. PATENT DOCUMENTS

| | | |
|---|---|---|
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |

(56) References Cited

U.S. PATENT DOCUMENTS

| | | |
|---|---|---|
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,061,716 B2 | 6/2006 | Sasaki et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,453 B2 | 12/2009 | Gill et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,544 B1 | 3/2010 | Mallary et al. |
| 7,688,546 B1 | 3/2010 | Bai et al. |

(56) References Cited

U.S. PATENT DOCUMENTS

| | | | |
|---|---|---|---|
| 7,691,434 B1 | 4/2010 | Zhang et al. | |
| 7,695,761 B1 | 4/2010 | Shen et al. | |
| 7,719,795 B2 | 5/2010 | Hu et al. | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,764,464 B2 * | 7/2010 | Kobayashi | 360/123.06 |
| 7,785,666 B1 | 8/2010 | Sun et al. | |
| 7,796,356 B1 | 9/2010 | Fowler et al. | |
| 7,800,858 B1 | 9/2010 | Bajikar et al. | |
| 7,819,979 B1 | 10/2010 | Chen et al. | |
| 7,829,264 B1 | 11/2010 | Wang et al. | |
| 7,846,643 B1 | 12/2010 | Sun et al. | |
| 7,855,854 B2 | 12/2010 | Hu et al. | |
| 7,869,160 B1 | 1/2011 | Pan et al. | |
| 7,872,824 B1 | 1/2011 | Macchioni et al. | |
| 7,872,833 B2 | 1/2011 | Hu et al. | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 7,916,426 B2 | 3/2011 | Hu et al. | |
| 7,918,013 B1 | 4/2011 | Dunn et al. | |
| 7,942,327 B2 * | 5/2011 | Endo | 235/450 |
| 7,968,219 B1 | 6/2011 | Jiang et al. | |
| 7,982,989 B1 | 7/2011 | Shi et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,024,748 B1 | 9/2011 | Moravec et al. | |
| 8,035,921 B2 | 10/2011 | Sunwoo | |
| 8,072,705 B1 | 12/2011 | Wang et al. | |
| 8,074,345 B1 | 12/2011 | Anguelouch et al. | |
| 8,077,418 B1 | 12/2011 | Hu et al. | |
| 8,077,434 B1 | 12/2011 | Shen et al. | |
| 8,077,435 B1 | 12/2011 | Liu et al. | |
| 8,077,557 B1 | 12/2011 | Hu et al. | |
| 8,079,135 B1 | 12/2011 | Shen et al. | |
| 8,081,403 B1 | 12/2011 | Chen et al. | |
| 8,091,210 B1 | 1/2012 | Sasaki et al. | |
| 8,097,846 B1 | 1/2012 | Anguelouch et al. | |
| 8,104,166 B1 | 1/2012 | Zhang et al. | |
| 8,116,043 B2 | 2/2012 | Leng et al. | |
| 8,116,171 B1 | 2/2012 | Lee | |
| 8,125,856 B1 | 2/2012 | Li et al. | |
| 8,134,794 B1 | 3/2012 | Wang | |
| 8,136,224 B1 | 3/2012 | Sun et al. | |
| 8,136,225 B1 | 3/2012 | Zhang et al. | |
| 8,136,805 B1 | 3/2012 | Lee | |
| 8,141,235 B1 | 3/2012 | Zhang | |
| 8,146,236 B1 | 4/2012 | Luo et al. | |
| 8,149,536 B1 | 4/2012 | Yang et al. | |
| 8,151,441 B1 | 4/2012 | Rudy et al. | |
| 8,163,185 B1 | 4/2012 | Sun et al. | |
| 8,164,760 B2 | 4/2012 | Willis | |
| 8,164,855 B1 | 4/2012 | Gibbons et al. | |
| 8,164,864 B2 | 4/2012 | Kaiser et al. | |
| 8,165,709 B1 | 4/2012 | Rudy | |
| 8,166,631 B1 | 5/2012 | Tran et al. | |
| 8,166,632 B1 | 5/2012 | Zhang et al. | |
| 8,169,473 B1 | 5/2012 | Yu et al. | |
| 8,171,618 B1 | 5/2012 | Wang et al. | |
| 8,179,636 B1 | 5/2012 | Bai et al. | |
| 8,191,237 B1 | 6/2012 | Luo et al. | |
| 8,194,365 B1 | 6/2012 | Leng et al. | |
| 8,194,366 B1 | 6/2012 | Li et al. | |
| 8,196,285 B1 | 6/2012 | Zhang et al. | |
| 8,200,054 B1 | 6/2012 | Li et al. | |
| 8,203,800 B2 | 6/2012 | Li et al. | |
| 8,208,350 B1 | 6/2012 | Hu et al. | |
| 8,220,140 B1 | 7/2012 | Wang et al. | |
| 8,222,599 B1 | 7/2012 | Chien | |
| 8,225,488 B1 | 7/2012 | Zhang et al. | |
| 8,227,023 B1 | 7/2012 | Liu et al. | |
| 8,228,633 B1 | 7/2012 | Tran et al. | |
| 8,231,796 B1 | 7/2012 | Li et al. | |
| 8,233,248 B1 | 7/2012 | Li et al. | |
| 8,248,896 B1 | 8/2012 | Yuan et al. | |
| 8,254,060 B1 | 8/2012 | Shi et al. | |
| 8,257,597 B1 | 9/2012 | Guan et al. | |
| 8,259,410 B1 | 9/2012 | Bai et al. | |
| 8,259,539 B1 | 9/2012 | Hu et al. | |
| 8,262,918 B1 | 9/2012 | Li et al. | |
| 8,262,919 B1 | 9/2012 | Luo et al. | |
| 8,264,797 B2 | 9/2012 | Emley | |
| 8,264,798 B1 | 9/2012 | Guan et al. | |
| 8,270,126 B1 | 9/2012 | Roy et al. | |
| 8,276,258 B1 | 10/2012 | Tran et al. | |
| 8,277,669 B1 | 10/2012 | Chen et al. | |
| 8,279,719 B1 | 10/2012 | Hu et al. | |
| 8,284,517 B1 | 10/2012 | Sun et al. | |
| 8,288,204 B1 | 10/2012 | Wang et al. | |
| 8,289,821 B1 | 10/2012 | Huber | |
| 8,291,743 B1 | 10/2012 | Shi et al. | |
| 8,307,539 B1 | 11/2012 | Rudy et al. | |
| 8,307,540 B1 | 11/2012 | Tran et al. | |
| 8,308,921 B1 | 11/2012 | Hiner et al. | |
| 8,310,785 B1 | 11/2012 | Zhang et al. | |
| 8,310,901 B1 | 11/2012 | Batra et al. | |
| 8,315,019 B1 | 11/2012 | Mao et al. | |
| 8,316,527 B2 | 11/2012 | Hong et al. | |
| 8,320,076 B1 | 11/2012 | Shen et al. | |
| 8,320,077 B1 | 11/2012 | Tang et al. | |
| 8,320,219 B1 | 11/2012 | Wolf et al. | |
| 8,320,220 B1 | 11/2012 | Yuan et al. | |
| 8,320,722 B1 | 11/2012 | Yuan et al. | |
| 8,322,022 B1 | 12/2012 | Yi et al. | |
| 8,322,023 B1 | 12/2012 | Zeng et al. | |
| 8,325,569 B1 | 12/2012 | Shi et al. | |
| 8,333,008 B1 | 12/2012 | Sin et al. | |
| 8,334,093 B2 | 12/2012 | Zhang et al. | |
| 8,336,194 B2 | 12/2012 | Yuan et al. | |
| 8,339,736 B2 * | 12/2012 | Gao et al. | 360/123.06 |
| 8,339,738 B1 | 12/2012 | Tran et al. | |
| 8,341,826 B1 | 1/2013 | Jiang et al. | |
| 8,343,319 B1 | 1/2013 | Li et al. | |
| 8,343,364 B1 | 1/2013 | Gao et al. | |
| 8,345,382 B1 | 1/2013 | Sasaki et al. | |
| 8,349,195 B1 | 1/2013 | Si et al. | |
| 8,351,307 B1 | 1/2013 | Wolf et al. | |
| 8,357,244 B1 | 1/2013 | Zhao et al. | |
| 8,358,487 B2 | 1/2013 | Sasaki et al. | |
| 8,373,945 B1 | 2/2013 | Luo et al. | |
| 8,375,564 B1 | 2/2013 | Luo et al. | |
| 8,375,565 B2 | 2/2013 | Hu et al. | |
| 8,381,391 B2 | 2/2013 | Park et al. | |
| 8,385,157 B1 | 2/2013 | Champion et al. | |
| 8,385,158 B1 | 2/2013 | Hu et al. | |
| 8,394,280 B1 | 3/2013 | Wan et al. | |
| 8,400,731 B1 | 3/2013 | Li et al. | |
| 8,404,128 B1 | 3/2013 | Zhang et al. | |
| 8,404,129 B1 | 3/2013 | Luo et al. | |
| 8,405,930 B1 | 3/2013 | Li et al. | |
| 8,409,453 B1 | 4/2013 | Jiang et al. | |
| 8,413,317 B1 | 4/2013 | Wan et al. | |
| 8,416,540 B1 | 4/2013 | Li et al. | |
| 8,419,953 B1 | 4/2013 | Su et al. | |
| 8,419,954 B1 | 4/2013 | Chen et al. | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,961 B1 | 6/2013 | Wang et al. | |
| 8,456,963 B1 | 6/2013 | Hu et al. | |

(56) References Cited

U.S. PATENT DOCUMENTS

| | | |
|---|---|---|
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,762 B1 * | 11/2013 | Sasaki et al. ............. 360/125.29 |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2004/0184189 A1 * | 9/2004 | Mochizuki et al. ........... 360/125 |
| 2005/0007697 A1 | 1/2005 | Hsu et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0188666 A1 | 7/2012 | Sasaki et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

MAGNETIC WRITER HAVING A PARTIALLY SHUNTED COIL

BACKGROUND

FIG. 1 depicts a side view of a conventional magnetic recording head 10. The magnetic recording head 10 may be a perpendicular magnetic recording (PMR) head. The conventional magnetic recording head 10 includes a read transducer 12 and a write transducer 20. The conventional read transducer 12 includes shields 14 and 18 and sensor 16. The read sensor 16 is typically a giant magnetoresistive (GMR) sensor or tunneling magnetoresistive (TMR) sensor. The write transducer 20 includes a first, or return, pole 22, coils 24 and 32, back gap 26, auxiliary poles 28, main pole 30 and shield 34. Although not shown, the main pole 30 may have leading and/or trailing edge bevels. In such cases, the main pole 30 is shortest in the down track direction at the ABS.

Although the conventional magnetic recording head 10 functions, there are drawbacks. In particular, the trend in magnetic recording toward higher recording densities and, therefore, smaller track widths and bit lengths. The conventional magnetic recording head 10 may not perform sufficiently at higher recording densities and higher recording speeds. For example, the main pole may not have sufficiently fast reversals in magnetic flux unless the pole is shrunk. If the pole is shrunk, then the same current through the coils 24 and 32 may result in increased wide area track erasure (WATER) issues. Such an increase in erasure issues is undesirable. Using fewer turns in the coils 24 and/or 32 may mitigate WATER issues, but slows the reversals in magnetic flux. Thus, performance of the magnetic transducer 10 again may suffer. Accordingly, what is needed is a system and method for improving the performance of a magnetic recording head, particularly for higher recording densities.

DETAILED DESCRIPTION OF THE PREFERRED EMBODIMENTS

Figure 1:
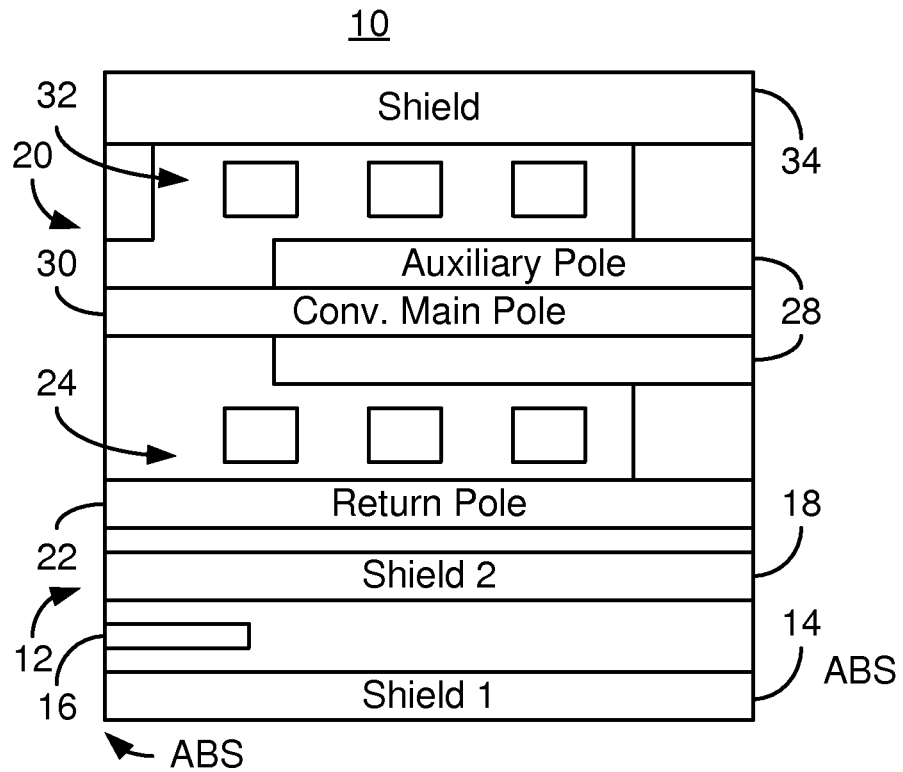
FIG. 1 depicts a side view of a conventional magnetic recording head.
Figure 2A:
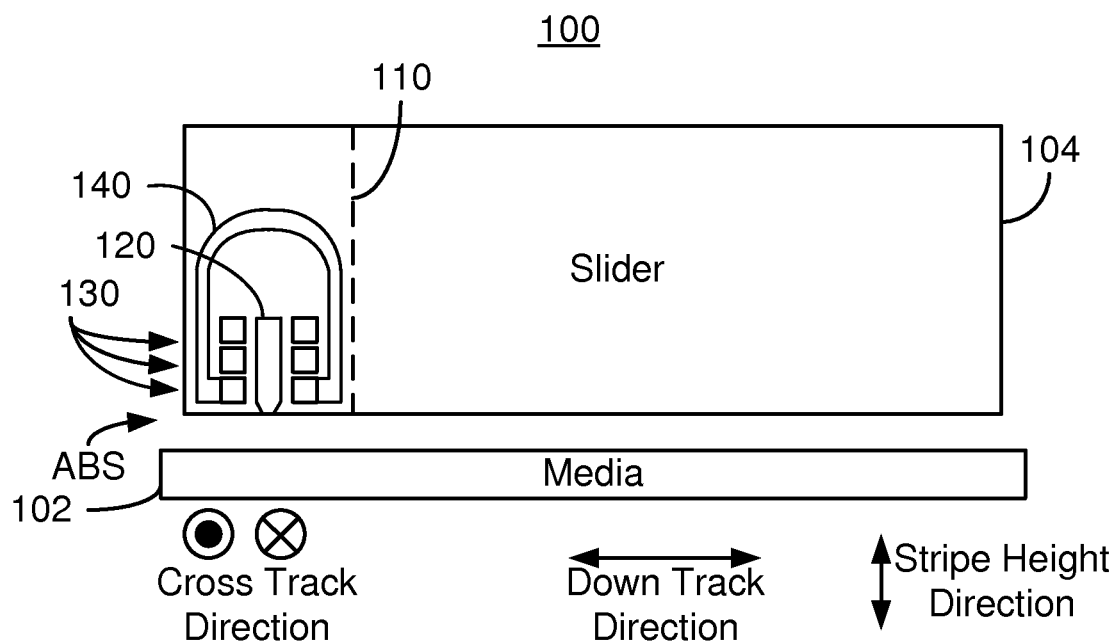
FIGS. 2A-2B depicts an exemplary embodiment of a magnetic recording disk drive.
Figure 2B:
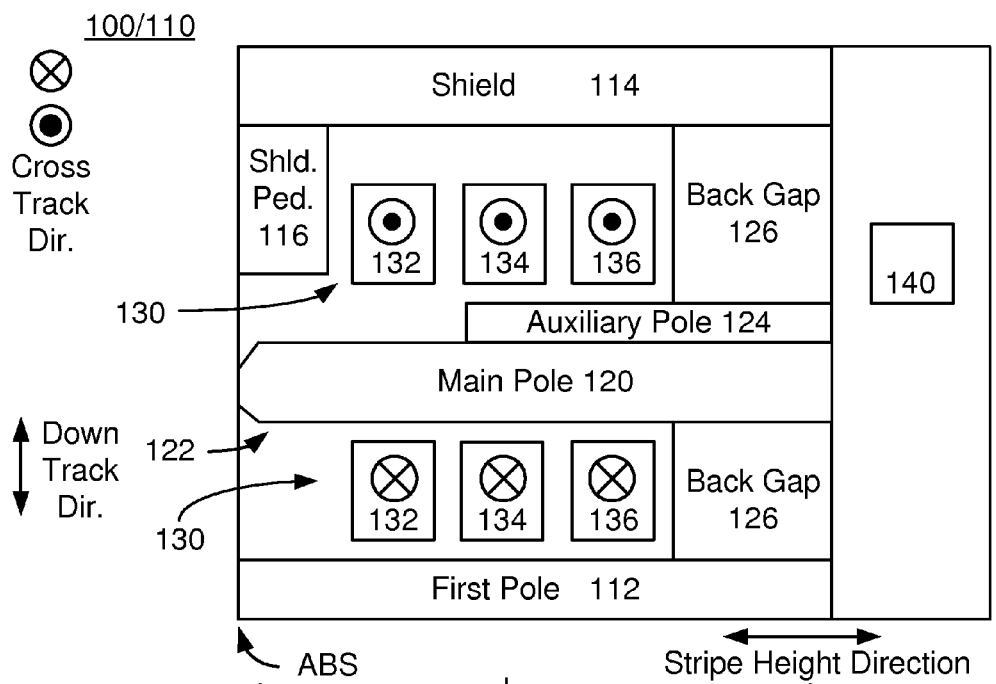

FIGS. 2A and 2B depict side views of an exemplary embodiment of a portion of a disk drive 100 and transducer 110. For clarity, FIGS. 2A and 2B are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 104 and a write transducer 110. Additional and/or different components may be included in the disk drive 100. Although not shown, the slider 104 and thus the transducer 110 are generally attached to a suspension (not shown).

The transducer 110 is fabricated on the slider 104 and includes an air-bearing surface (ABS) proximate to the media 102 during use. In general, the disk drive 100 includes a write transducer 110 and a read transducer (not shown). However, for clarity, only the write transducer 110 is shown. The transducer 110 includes a main pole 120, coil(s) 130 and at least one shunt 140. The main pole 120 has a yoke length, L. In some embodiments, the yoke length is reduced. For example, in some embodiments, the yoke length is less than five microns. In some such embodiments, the yoke length is less than 4.9 microns. However, other yoke lengths are possible.

Also shown in FIG. 2B are an auxiliary pole 124, first pole 112, shield 114, shield pedestal 116, and back gap 126. The auxiliary pole 124 is shown as located between the main pole 120 and the shield 114. In other embodiments, the auxiliary pole 124 may be between the main pole 120 and the first pole 112 or two auxiliary poles on either side of the main pole in the down track direction may be used. In other embodiments, different and/or additional components may be used in the write transducer 110.

The coil(s) 130 shown includes three turns 132, 134 and 136. In some embodiments, the turns 132, 134 and 136 are for a single, helical coil. In other embodiments, the turns 132, 134 and 136 for each coil 130 is only part of a spiral coil. In such embodiments, then additional portions of the coil(s) 130 may be located further from the ABS. Further, additional coils may also be used. The coil(s) 130 may have different numbers of turns and/or may have multiple layers of turns.

Also shown in FIGS. 2A and 2B is shunt 140. In the embodiment shown, the back gap 126 is between a portion of the shunt 140 and the ABS/coil(s) 130. However, in other embodiments, the shunt 140 may be located elsewhere. For example, the shield 114 may be between a portion of the shunt 140 and the coil(s) 130. In other embodiments, first pole 112 may be between part of the shunt 140 and the coil(s) 130. In other embodiments, main pole 120 may be between part of the shunt 140 and the coil(s) 130. In still other embodiments, the shunt 140 extend in the cross-track direction from the coil(s) 130. The shunt 140 is also depicted as being at a different level from the coil(s) 130 in a down track direction. In some embodiments, however, the shunt 140 may be at the same level as the coil 130 to which the shunt 140 is connected. Such a configuration may allow the shunt to be fabricated more easily. Further, although a single shunt 140 that is connected to one of the turns 132, 134 or 136 is shown, in another embodiment, multiple shunts connected to multiple turns may be used.

Shunt 140 is connected to one of the turns 132, 134 or 136 to shunt a portion of the current that would otherwise be carried in that turn. For example, in FIG. 2A, the shunt 140 is depicted as being connected to the turn of the coil(s) 130 that are closest from the ABS. Such a turn corresponds to the turn 132. In such an embodiment, turns 134 and 136 carry one current, while turn 132 carries a smaller current. The sum of the currents carried by the shunt 140 and the turn 132 equals the current carried by the turn 134 or 136. The amount of current carried by the shunt 140 may be set by the resistance and, therefore, the geometry of the shunt 140. The larger the resistance of the shunt, the lower the amount of current carried by the shunt.

The coil(s) 130 have a particular number of turns. In the embodiment depicted in FIGS. 2A and 2B, this number is three. Because of the presence of the shunt 140, the effective number of turns in the coil(s) 130 may be reduced. The effective number of turns is related to the current carried in proximity to the main pole. Without the shunt 140, the effective number of turns for the coil(s) is the same as the actual number of turns: three. Because some of the current through one or more turns is carried by the shunt 140 instead of the coil(s) 130, the effective number of turns for the transducer 110 is less than three. The larger the amount of current carried by the shunt 140, the smaller the effective number of turns. In some embodiments, the effective number of turns is at least two and less than three. In some such embodiments, the effective number of turns is at least 2.5 (e.g. 50% shunting on one of the turns). For example, the effective number of turns may be nominally 2.6, 2.65, 2.75 or another number greater than two and less than three. Note that for another number of turns for the coil(s) 130, an analogous relationship holds. In other words, the shunt 140 allows for a nonintegral effective number of turns that is less than the actual number of turns of the coil(s) 130. Further, although an integral effective number of turns is possible through the use of the shunt 140, it is expected that such a number of turns will simply be formed by adding to or subtracting from the actual number of turns.

The magnetic disk drive 100 may exhibit improved performance. As discussed above, the yoke length of the main pole 120 may be reduced. The response time of the pole 120 may thus be improved. Data may be written at a higher rate. The shunting of the coil(s) 130 allows for a balance between erasure issues and providing a higher writing field and faster saturation of the pole 120. In particular, reducing the effective number of turns may mitigate WATER while maintaining sufficient field for writing. Stated differently, the signal-to-noise ratio for the transducer 110 may be improved. Thus, performance of the write transducer 110 and disk drive 100 may be improved.

Figure 3A:
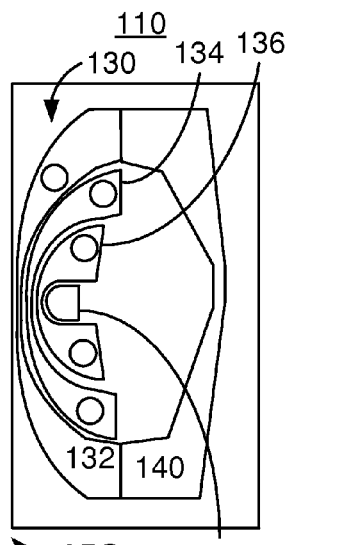
FIGS. 3A-3C depict plan views of exemplary embodiments of a magnetic recording transducer.
Figure 3B:
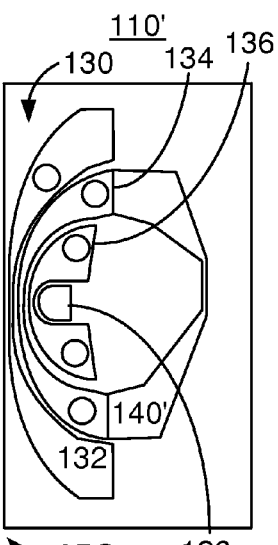
Figure 3C:
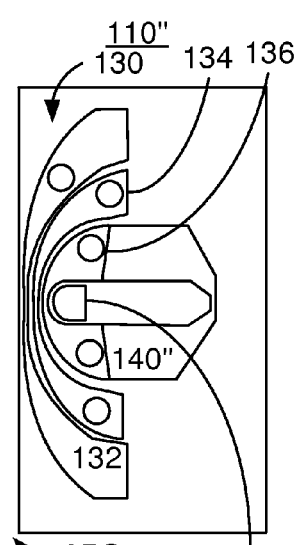

FIGS. 3A-3C depict top views of exemplary embodiments of a magnetic transducer 110, 110', and 110" that may be used in a disk drive 100. For clarity, FIGS. 3A-3C are not to scale. More specifically, a portion of the transducers 110, 110' and 110" are depicted. A portion of a coil 130, back gap 126 and shunts 140, 140' and 140" are depicted in FIGS. 3A, 3B and 3C, respectively. The coil 130 are helical coils in the transducers 110, 110' and 110". FIG. 3A depicts an embodiment of the transducer 110 in which the shunt 140 is connected to the turn 132. Turns 134 and 136 are unshunted. In FIG. 3A, the circles within each turn 132, 134 and 136 denote a connection to the next turn that runs perpendicular to the page. As can be seen in FIG. 3A, the turn 132 that is closest to the ABS is connected with the shunt 140. It is believed that shunting of the turn 132 closest to the ABS may be the most effective because this turn is closest to the pole tip. However, shunting of the other turns 134 and/or 136 may also be effective. FIG. 3B depicts a plan view another embodiment of the magnetic transducer 110'. In the transducer 110', the center turn 134 is connected to the shunt 140'. FIG. 3C depicts an embodiment of the transducer 110" in which the turn 136 further from the ABS is connected to the shunt 140". Thus, different turns 132, 134 and 136 are shunted in the transducers 110, 110' and 110". However, in each transducer 110, 110' and 110", the effective number of turns may be the same. For example, the shunts 140, 140' and 140" may each shunt 50% of the current from the corresponding turn 132, 134 and 136, respectively. Thus, the effective number of turns for the transducer 110, 110' and 110" may be the same.

Each of the transducers 110, 110' and 110" may enjoy the benefits described above. The yoke length of the main pole may be reduced and response time of the main pole improved. Data may thus be written at a higher rate. The shunting of the coil(s) 130 by shunts 140, 140' and/or 140" allows for improved WATER (reduced off-track erasure) while maintaining sufficient field for writing. Thus, performance of the write transducer 110, 110', and/or 110" and disk drive 100 may be improved.

Figure 4A:
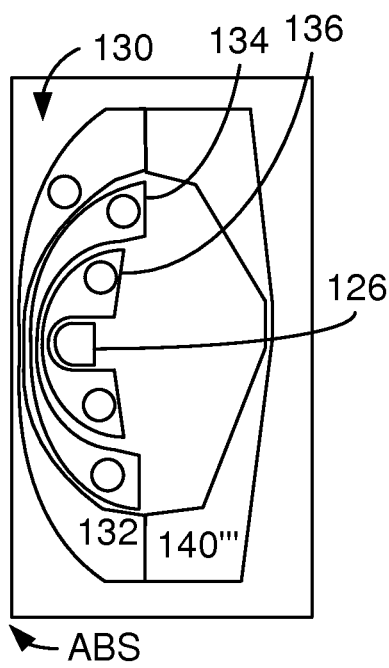
FIGS. 4A-4B depict plan views of exemplary embodiments of a magnetic recording transducer.
Figure 4B:
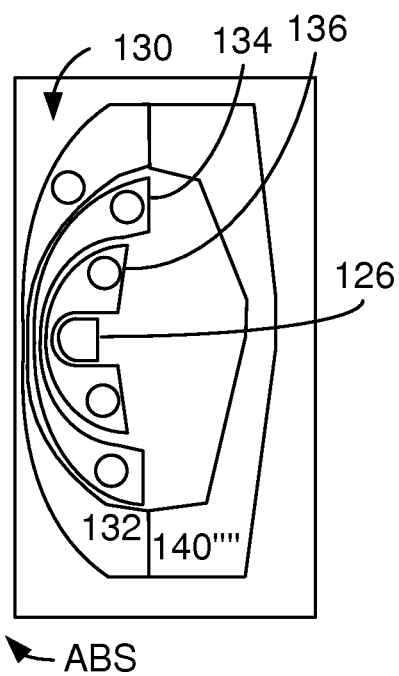

FIGS. 4A-4B depict top views of exemplary embodiments of a magnetic transducer 110''' and 110'''' that may be used in a disk drive 100. For clarity, FIGS. 4A-4B are not to scale. More specifically, a portion of the transducers 110''' and 110'''' are depicted. A portion of a coil 130, back gap 126 and shunts 140''' and 140'''' are depicted in FIGS. 4A and 4B, respectively. The coil 130 is a helical coil in the transducers 110''' and 110''''. FIGS. 4A and 4B may be considered with FIG. 3A, as the transducers 110, 110''' and 110'''' include shunts 140, 140''' and 140'''', respectively, that are coupled with the same turn 132 of the coil 130. Thus, the same turn 132 is shunted in the transducers 110, 110''' and 110''''. However, in each transducer 110, 110''' and 110'''', the effective number of turns is different. For example, the shunt 140 shunts more of the current than the shunt 140''' but less of the current than the shunt 140''''. Thus, the amount of current shunted from a particular turn may be changed by configuring the shunt 140, 140''' and/or 140''''.

Each of the transducers 110, 110''' and 110'''' may enjoy the benefits described above. The yoke length of the main pole may be reduced and response time of the main pole improved. Data may thus be written at a higher rate. The shunting of the coil(s) 130 by shunts 140, 140''' and/or 140'''' allows for improved WATER while maintaining sufficient field for writing. Thus, performance of the write transducer 110, 110''', and/or 110'''' and disk drive 100 may be improved.

Figure 5:
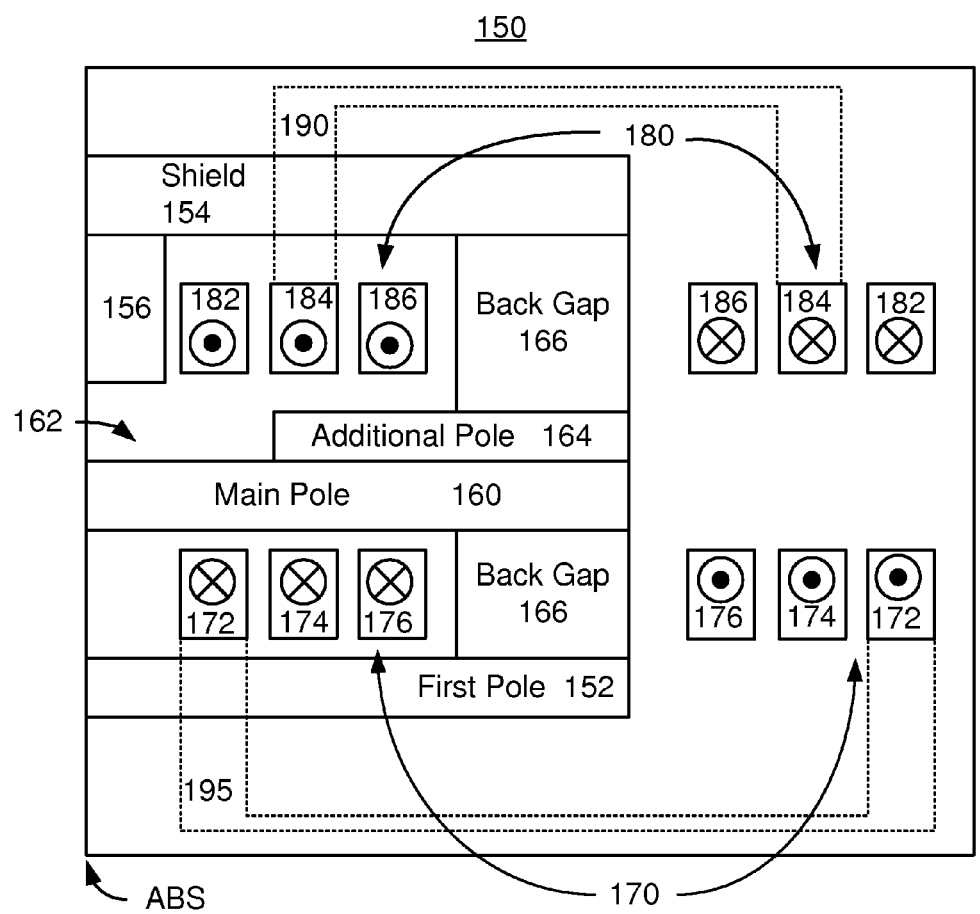
FIG. 5 depicts a side view of another exemplary embodiment of a magnetic recording transducer.

FIG. 5 depicts a side view of an exemplary embodiment of a magnetic transducer 150. For simplicity, only a portion of the magnetic recording transducer 150 is shown. FIG. 5 is not to scale for clarity. The magnetic recording transducer 150 is analogous to the transducers 110, 110', 110", 110''' and/or 110''''. Consequently, analogous components have similar labels. The write transducer 150 thus includes a first pole 152, shield 154 having pedestal 156, back gaps 166, main pole 160, auxiliary pole 164, coils 170 and 180 and shunts 190 and 195 that are analogous to the first pole 112, shield 114 having pedestal 116, back gaps 126, main pole 120, auxiliary pole 124, coil(s) 130 and shunt 140, respectively depicted in FIGS. 2A-4B. In the embodiment shown, the coil 170 is a spiral coil having turns 172, 174 and 176. Similarly, the coil 180 is a spiral coil having turns 182, 184 and 186. In the embodiment shown, the coils 170 and 180 have the same number of turns. However, in other embodiments, the coils 170 and 180 may have a different number of turns. Further, each coil 170 and 180 is shown as having three turns. In another embodiment, the coil 170 and/or 180 may have a different number of turns. In addition, the coils 170 and 180 each includes a single layer of turns. In another embodiment, the coil 170 and/or 180 may include multiple layers. Further additional coil(s) may be used.

Also shown in FIG. 5 are shunts 190 and 195. The shunt 190 is connected to the center turn 184 of the coil 180. The shunt 195 is connected to the first turn 172 (closest to the ABS) of the coil 170. In the embodiment shown, the pole 152 and shield 154 is between a portion of the shunt 195 and 190, respectively, and the coil 170 and 180, respectively. However, in other embodiments, the shunt 190 and/or 195 may be configured differently. For example, in other embodiments, the shunt 190 and/or 195 extend in the cross-track direction from the coil 170 and/or 180, respectively. Further, although a single shunt 190 and 195 that is connected to one of the coils 180 and 170, respectively, in another embodiment, multiple shunts may be connected to multiple turns of each coil 170 and/or 180. In addition, different turns of the coil 170 and/or 180 may be shunted.

Shunts 190 and 195 shunt a portion of the current that would otherwise be carried in the turn 184 and 172, respectively. The shunts 190 and 195 also function in an analogous manner to the shunts 140, 140', 140'', 140''' and 140''''. The amount of current carried by the shunts 190 and 195 may be set by the resistance and, therefore, the geometry of the shunts 190 and 195, respectively. The larger the resistance of the shunt, the lower the amount of current carried by the shunt. Because of the presence of the shunts 190 and 195, the effective number of turns in the coils 170 and 180 is reduced. The larger the amount of current carried by the shunt 190 and 195, the smaller the effective number of turns in the coils 170 and 180. The shunts 190 and 195 allow for a nonintegral effective number of turns that is less than the actual number of turns of the coils 170 and 180. Further, although an integral effective number of turns is possible through the use of the shunts 190 and 195, it is expected that such a number of turns will simply be formed by adding to or subtracting from the actual number of turns.

The magnetic transducer 150 may exhibit improved performance. As discussed above, the yoke length of the main pole 160 may be reduced. The response time of the pole 160 may thus be improved. Data may be written at a higher rate. The shunting of the coils 170 and 180 allows for mitigating WATER while maintaining sufficient field for writing. Thus, performance of the write transducer 150 and disk drive 100 in which the transducer 150 may be improved.

Figure 6:
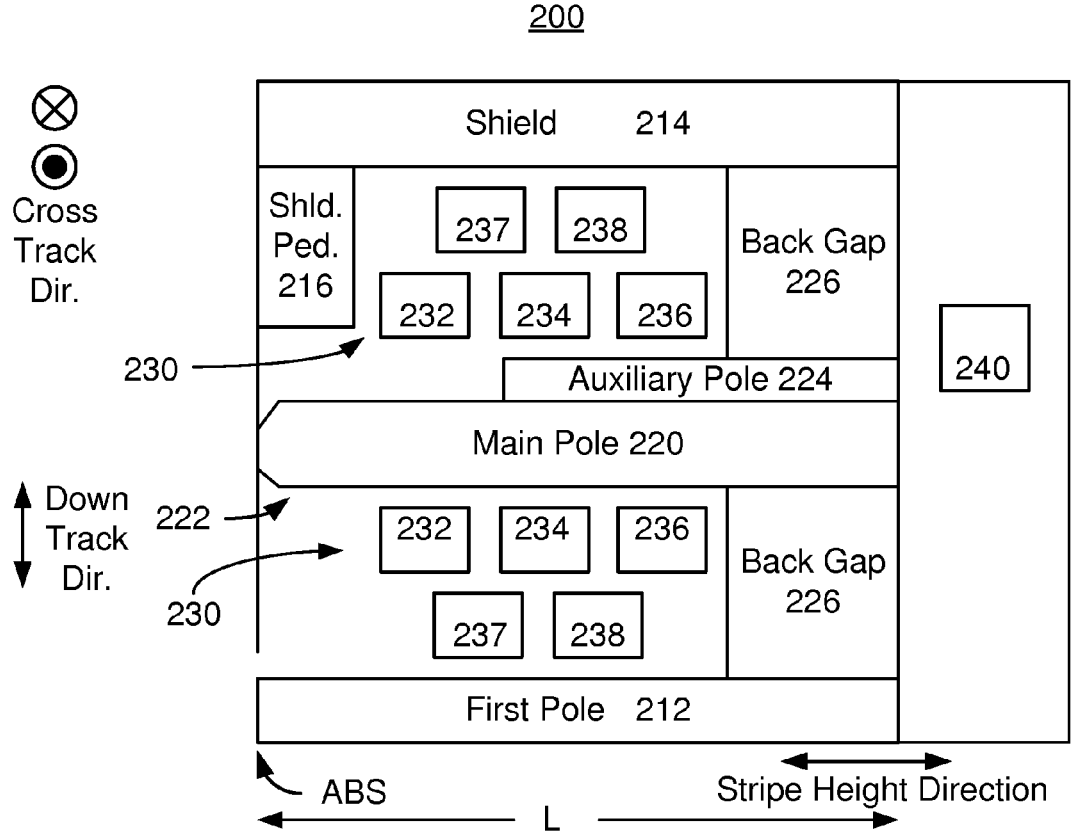
FIG. 6 depicts a side view of another exemplary embodiment of a magnetic recording transducer.

FIG. 6 depicts a side view of an exemplary embodiment of a magnetic transducer 200. For simplicity, only a portion of the magnetic recording transducer 200 is shown. FIG. 6 is not to scale for clarity. The magnetic recording transducer 200 is analogous to the transducers 110, 110', 110'', 110''', 100'''' and/or 150. Consequently, analogous components have similar labels. The write transducer 200 thus includes a first pole 212, shield 214 having pedestal 216, back gaps 226, main pole 220, auxiliary pole 224, coil(s) 230 and shunt 240 that are analogous to the first pole 112/152, shield 114/154 having pedestal 116/156, back gaps 126/166, main pole 120/160, auxiliary pole 124/164, coil(s) 130/170 and 180 and shunt(s) 140/190 and 195, respectively depicted in FIGS. 2A-5. In the embodiment shown, the coil(s) 230 may be a helical coil or two spiral coils. The coil(s) 230 have turns 232, 234, 236, 237 and 238. In the embodiment shown, the coil(s) 230 have five turns. However, in other embodiments, the coil(s) 230 may have a different number of turns.

In the embodiment shown, the coil(s) 230 have two layers of turns. The shunt 240 may be connected to any of the turns 232, 234, 236, 237 and/or 238. Although a single shunt 240 is shown, in another embodiment, multiple shunts may be connected to multiple turns of the coil(s) 230.

The shunt 240 functions in an analogous manner to the shunts 140, 140', 140'', 140''', 140'''', 190 and/or 195. The amount of current carried by the shunts 240 may be set by the resistance and, therefore, the geometry of the shunt 240. The larger the resistance of the shunt, the lower the amount of current carried by the shunt. Because of the presence of the shunt 240, the effective number of turns in the coil(s) 230 is reduced. The shunt 240 allows for a nonintegral effective number of turns that is less than the actual number of turns of the coil(s) 230. Further, although an integral effective number of turns is possible through the use of the shunt 240, it is expected that such a number of turns will simply be formed by adding to or subtracting from the actual number of turns.

The magnetic transducer 200 may exhibit improved performance. As discussed above, the yoke length of the main pole 220 may be reduced. The response time of the pole 220 may thus be improved. The shunting of the coil(s) 230 allows for improved WATER while maintaining sufficient field for writing. Thus, performance of the write transducer 250 and disk drive 100 in which the transducer 150 may be improved.

Figure 7:
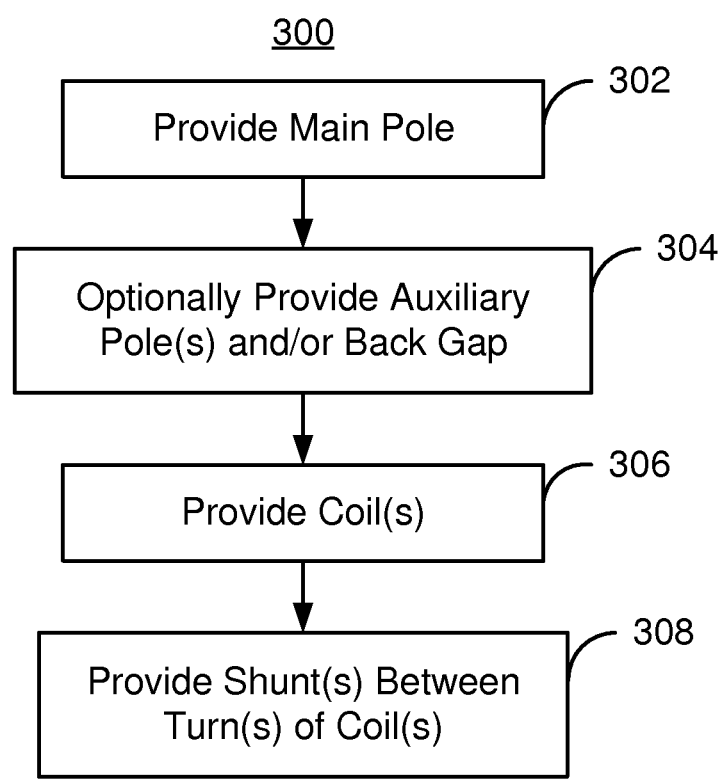
FIG. 7 is flow chart depicting an exemplary embodiment of a method for fabricating a magnetic recording head.

FIG. 7 depicts an exemplary embodiment of a method 300 for providing a magnetic recording transducer having a main pole that may have a shortened yoke length. For simplicity, some steps may be omitted, interleaved, and/or combined. The method 300 is also described in the context of providing a magnetic recording head 100 depicted in FIGS. 2A-2B and 3A. However, the method 300 may be used to fabricate multiple magnetic recording heads at substantially the same time. The method 300 may also be used to fabricate other magnetic recording transducers including but not limited to any combination of 110, 110', 110'', 110''', 110'''', 150 and/or 200. The method 300 is also described in the context of particular layers. A particular layer may include multiple materials and/or multiple sub-layers. The method 300 also may start after formation of other portions of the magnetic recording head. For example, the method 300 may start after a read transducer, return pole/shield and/or other structure have been fabricated.

Referring to FIGS. 2A-2B, 3A and 7, the main pole 130 is provided, via step 302. Step 302 may include using a damascene process. For example, a trench may be formed in a layer and the material(s) for the pole 130 deposited and patterned.

The auxiliary pole(s) 124 and back gap 126 may be provided, via step 304. However, if one or both of the structures 124 and 126 are omitted, then some or all of step 304 may be skipped.

The coil(s) 130 are provided, via step 306. Portions of step 306 may thus be interleaved with the remaining steps of the method 300. For example, the coil(s) 130 between the main pole 120 and the first pole 112 may be provided before the formation of the auxiliary pole 124 and the main pole 120. Step 306 may also include depositing and patterning the material(s) used for the coil(s) 140.

The shunt 140, 140', 140'', 140''', 140'''', 170, 190 and/or 195 may also be provided, via step 308. Step 308 includes connecting the shunt(s) to the desired turn(s) of the coil(s). Thus, the shunt 140, 140', 140'', 140''', 140'''', 170, 190 and/or 195 may be used to tailor effective number of turns in a coil and, therefore, the write properties of the transducer 110, 110', 110'', 110''', 110'''', 150 and/or 200. Fabrication of the transducer may then be completed.

Using the method 300, the magnetic transducers 110, 110', 110'', 110''', 110'''', 150 and/or 200 may be provided. Thus, the benefits of the magnetic transducers 110, 110', 110'', 110''', 110'''', 150 and/or 200 may be achieved.

We claim:

1. A magnetic transducer having air-bearing surface (ABS) comprising:
   a main pole;
   at least one coil for energizing the main pole and having a number of turns; and
   at least one shunt coupled to at least one of the number of turns, at least one remaining turn of the number of turns carrying a current, the at least one shunt carrying a portion of the current from the at least one of the number of turns such that the at least one coil has an effective number of turns, the effective number of turns being less than the number of turns.

2. The magnetic transducer of claim 1 further comprising: a back gap magnetically coupled with the main pole, the number of turns being between the ABS and the back gap.

3. The magnetic transducer of claim 2 wherein the back gap is between a portion of the at least one shunt and the ABS.

4. The magnetic transducer of claim 1 wherein the main pole is between a portion of the at least one shunt and the at least one turn.

5. The magnetic transducer of claim 1 wherein the effective number of turns is not an integer.

6. The magnetic transducer of claim 1 wherein the main pole includes a pole tip and wherein the at least one turn is closest to the pole tip of the number of turns.

7. The magnetic transducer of claim 1 wherein the main pole includes a pole tip and wherein the at least one turn is furthest from the pole tip of the number of turns.

8. The magnetic transducer of claim 1 wherein the main pole includes a pole tip and wherein the at least one turn is between a turn closest to the pole tip and another turn furthest from the pole tip of the number of turns.

9. The magnetic transducer of claim 1 wherein the number of turns is three.

10. The magnetic transducer of claim 8 wherein the effective number of turns is less than three and greater than two.

11. The magnetic transducer of claim 10 wherein the effective number of turns is at least 2.5.

12. The magnetic transducer of claim 1 wherein the at least one coil is selected from a helical coil and a spiral coil.

13. The magnetic transducer of claim 1 wherein the number of turns includes a plurality of layers of turns.

14. The magnetic transducer of claim 1 wherein the main pole has a yoke length of less than five microns.

15. A magnetic transducer having air-bearing surface (ABS) comprising:
a main pole including a pole tip and having a yoke length of less than five microns;
a back gap magnetically coupled with the main pole;
at least one coil for energizing the main pole and having three turns;
a shunt coupled to a first turn of the three turns closest to the pole tip, a remaining two turns of the three of turns carrying a current, the shunt carrying a portion of the current from the first turn such that the at least one coil has an effective number of turns, the effective number of turns being less than three and greater than 2.5.

16. A disk drive comprising:
a media,
a slider, and
a magnetic transducer coupled with the slider, the magnetic transducer having air-bearing surface (ABS), a main pole, at least one coil and at least one shunt, the at least one coil for energizing the main pole and having a number of turns greater than one, the at least one shunt being coupled to at least one of the number of turns, at least one remaining turn of the number of turns carrying a current, the at least one shunt carrying a portion of the current from the at least one of the number of turns such that the at least one coil has an effective number of turns, the effective number of turns being less than the number of turns.

17. A method for providing a magnetic transducer having air-bearing surface (ABS) comprising:
providing a main pole;
providing at least one coil for energizing the main pole and having a number of turns greater than one; and
providing at least one shunt coupled to at least one of the number of turns, at least one remaining turn of the number of turns carrying a current, the at least one shunt carrying a portion of the current from the at least one of the number of turns such that the at least one coil has an effective number of turns, the effective number of turns being less than the number of turns.

18. The method of claim 17 further comprising:
providing a back gap magnetically coupled with the main pole, the number of turns being between the ABS and the back gap.

19. The method of claim 18 wherein the back gap is between a portion of the at least one shunt and the ABS.

20. The method of claim 17 wherein the main pole is between a portion of the at least one shunt and the at least one turn.

21. The method of claim 17 wherein the effective number of turns is not an integer.

22. The method of claim 17 wherein the main pole includes a pole tip and wherein the at least one turn is closest to the pole tip of the number of turns.

23. The method of claim 17 wherein the number of turns is three and wherein the effective number of turns is greater 2 and less than 3.

24. The method of claim 17 wherein the step of providing the at least one coil further includes:
providing at least one of a helical coil and a spiral coil.

* * * * *